H. SEEMANN.
MECHANISM FOR EXHIBITING ILLUSTRATIONS OF TALKING MACHINE RECORDS.
APPLICATION FILED FEB. 19, 1912.
1,101,760.
Patented June 30, 1914.
2 SHEETS—SHEET 1.
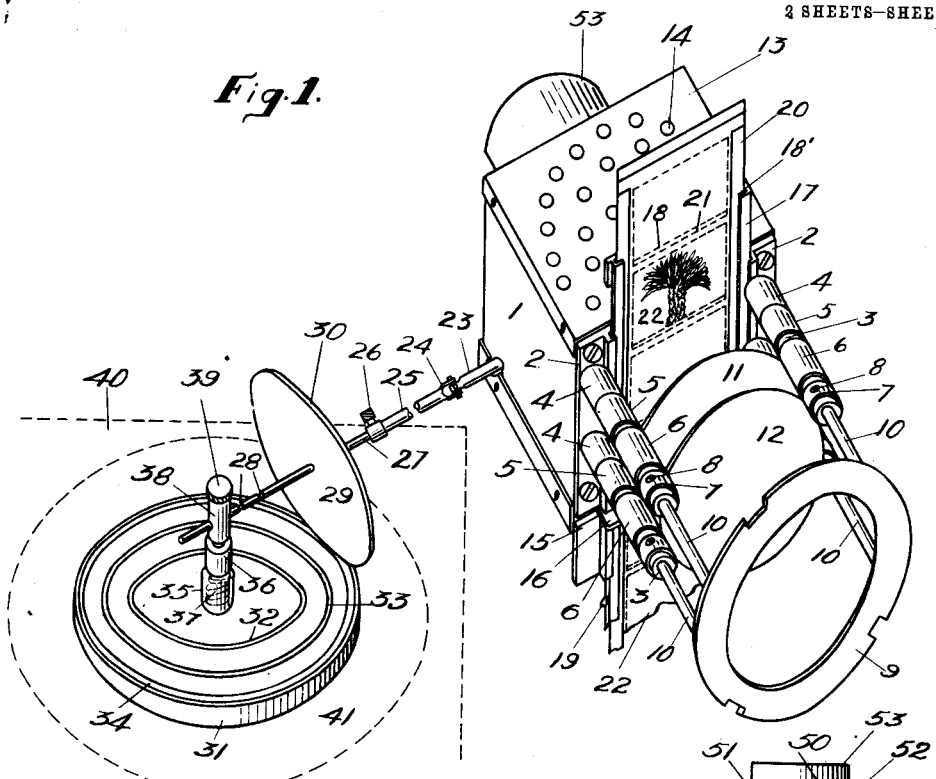
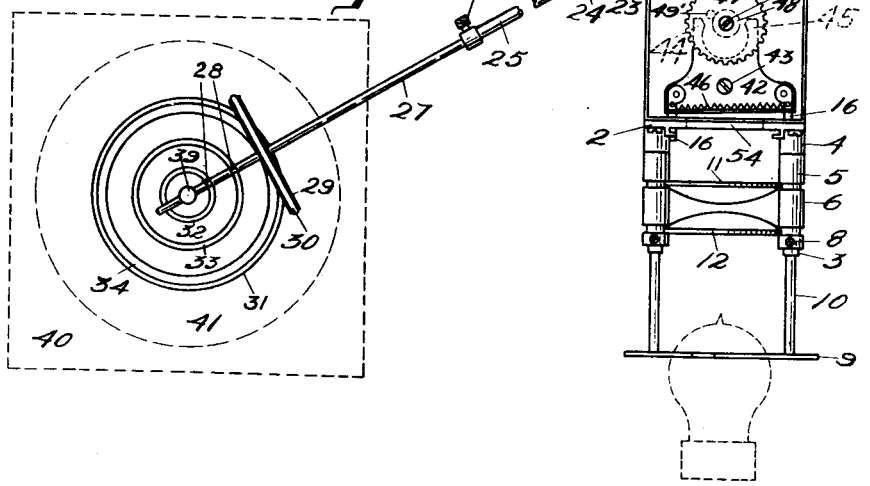
WITNESSES
A. L. Krayhill
Roy Barlow
INVENTOR
Henry Seemann H. SEEMANN.
MECHANISM FOR EXHIBITING ILLUSTRATIONS OF TALKING MACHINE RECORDS.
APPLICATION FILED FEB. 19, 1912.
1,101,760.
Patented June 30, 1914.
2 SHEETS—SHEET 2.
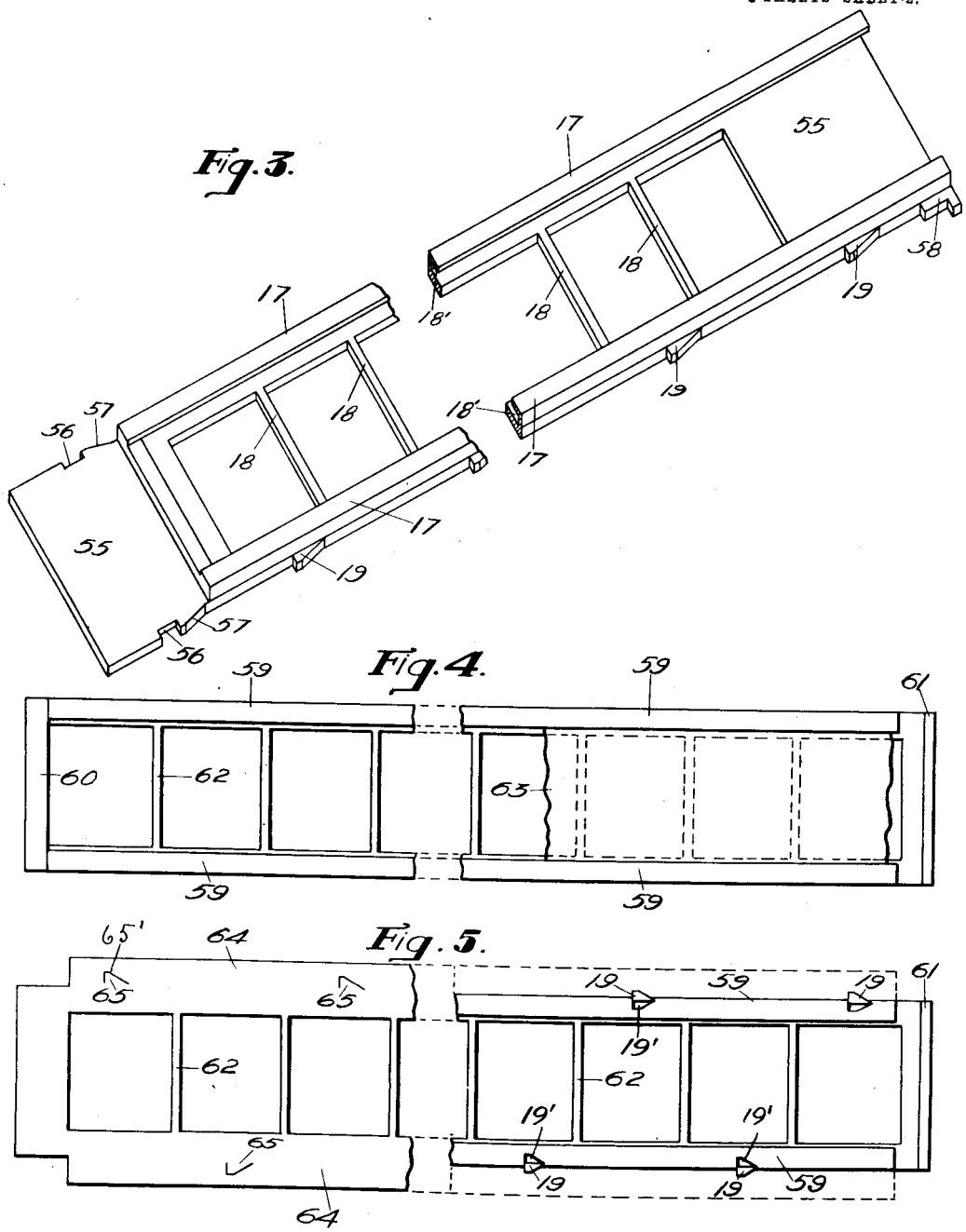
WITNESSES
A. Kraybill
Roy Barlow
INVENTOR
Henry Seemann

UNITED STATES PATENT OFFICE.

HENRY SEEMANN, OF LOS ANGELES, CALIFORNIA.

MECHANISM FOR EXHIBITING ILLUSTRATIONS OF TALKING-MACHINE RECORDS.

1,101,760.     Specification of Letters Patent.     Patented June 30, 1914.

Application filed February 19, 1912. Serial No. 678,485.

*To all whom it may concern:*

Be it known that I, HENRY SEEMANN, a citizen of the United States, residing at Los Angeles, in the county of Los Angeles and State of California, have invented a new and useful Improvement in Mechanism for Exhibiting Illustrations of Talking-Machine Records, of which the following is a specification.

My invention relates to devices for throwing up film pictures on a screen in connection with the operation of a talking machine, and my object is to provide a compact device that will, in coöperation with the revolving of the record disk of a talking machine, automatically move a series of film pictures into and out of the focus of a lens. I attain this object by means of the mechanism illustrated in the accompanying drawings, in which—

Figure 1 is a perspective view of my apparatus. Fig. 2 is a plan view of my device. Fig. 3 is a perspective view of the slide frame. Fig. 4 is a front elevation of the film holder. Fig. 5 is a front elevation of the holder blank.

In Fig. 1, 1 is a box, 2 slide ways, 3 lens posts, 4, 5 and 6 spacing sleeves on the posts, 7 collars, 8 set screws, 9 light holder, 10 light holder posts, 11 and 12 lenses, 13 perforated top for case, 14 perforations, 15 slots, 16 dogs, 17 slide frame, 18 braces, 18' grooves, 19 lugs, 20 film holder, 21 braces, 22 film, 23 worm shaft, 24 universal joint, 25 telescoping shaft, 26 set screw, 27 friction wheel shaft, 28 grooves in the shaft, 29 friction wheel, 30 friction tire, 31 friction disk, 32, 33 and 34 grooved tracks in disk, 35 tubular post, 36 spring post, 37 spring, 38 journal, 39 set screw, 40 talking machine, 41 talking machine disk. In the other figures the same characters refer to the same parts, and in Fig. 2, 42 is a pivoted swivel plate, 43 the pivot, 44, 45 arms on the plate, 46 a spring connecting the dogs 16, 47 a pinion gear, 48 gear hub, 49 pivotal screws, 49' a pin, 50 worm, 51, 52 journal standards, 53 objective lens, 54 view opening. In Fig. 3, 55 is the base of the slide frame, 56 slots, 57 lugs, 58 projecting top piece. In Fig. 4, 59 is the folded sides of the film holder, 60 the folded bottom, 61 the folded top, 62 braces, 63 the film. In Fig. 5, 64 is the unfolded side of the film holder, and 65 cuts for lugs, 65' is a cut out portion for a recess, and 19' is the recess formed from the cut.

The case or box 1 is made of any shape and of any material suitable for the purpose for which it is used. At its back are secured the vertical slide ways 2 each side of the opening 54. Outside of each of the slideways are secured to the box back the four horizontal posts 3 having sockets bored in their outermost ends. On these posts are movably fitted the sleeves 4, 5 and 6 and the collars 7 provided with the set screws 8. The light holder 9 has the lugs 10 which fit into the sockets in the ends of the posts 3. The condensing lenses 11 and 12 are held in place against the posts 3 by means of the sleeves 4, 5, and 6 and the collar 7. The cover 13 is made with its two ends bent over to fit over the edge of the top of the box 1 and has the perforations 14 in it. On each side of the back, at the bottom of the box, are formed the slots 15, through which the dogs 16 are adapted to project. The slide frame 17 has the cross bars or braces 18 to strengthen it, and its sides are formed into the grooves 18', and its base 55 is flat and has formed on its sides the slots 56 and the lugs 57, and on its top the flat piece having the side projection 58. On the outer edge of the sides are formed the lugs 19 alternating with each other in position on opposite sides of the frame. The film holder is made with folded edges 21 to hold a film and cross bars 62 to strengthen it. The bottom 60 is folded over the sides to hold the film and the top 61 is open to admit the film 63.

In the box 1 is the objective lens 53 through its front end in line with the opening 54. On the bottom of the box is pivoted by the pivot 43 the swivel plate 42 on the front end of which is formed the arms 44 and 45. Pivoted to its front end at each corner are the dogs 16 held normally in a parallel direction with the sides of the box by the connecting spring 46. These dogs project through the slot 15. Between the arms 44 and 45, is pivoted, to the bottom of the box 1, the pinion gear 47 by the pivot 49, having the hub 48 formed on its under side. From the side of the hub 48 projects the trip pin 49' adapted to engage the arms 44 and 45 as the gear revolves. Journaled in the standards 51 and 52 is the worm 50 adapted to engage the gear 47. The shaft 23 of the worm passes through the side of the box and is connected with the telescopic shaft 25 by the universal joint 24. The friction wheel 29 having on its periphery the rubber or other friction tire 30, has the rigid shaft 27 on both sides. The shaft on one side is adapted to slide into the telescopic shaft 25 and to be held there by means of the set screw 26. On the opposite side of the friction wheel the shaft has formed on it the grooves 28. The friction disk 31 is made of considerable weight and of a size to fit into the plain center of a phonographic disk record. In the bottom of the friction disk is formed a central hole, not shown, and running up into the stem 35 on top of the friction disk. In the top of this hollow stem 35 is seated the resilient journal plug 36, the spring 37 holding the plug resiliently to its seat. Through the plug 36 is bored the bearing 38 and in this bearing is journaled the grooved end of the friction wheel shaft and the set screw 39 is screwed down to engage one of the grooves, thus holding the friction wheel in one position. On the face of the friction disk 31 are formed a plurality of concentric grooves 32, 33 and 34 into one of which the periphery of the friction wheel 29 is adapted to ride depending upon which of the grooves 28 the set screw 39 engages. As the disk 31 is set upon the disk record 41 on the talking machine 40 the pin of the talking machine table engaging the hole in the bottom of the friction disk, when the record disk revolves it will carry the friction disk around with it, causing the friction wheel 29 to revolve at a rate of speed governed by the groove in which it is traveling. The shafts 27, 25, and 23 will thus be revolved, the universal joint 24 allowing the talking machine to be placed at any angle to the box, and the worm 50 will revolve the gear 47. When the pin 49' reaches one of the arms of the swivel plate 42 it will cause the plate to turn on its pivot and to draw one of the dogs 16 in and thrust the other one out.

The slide frame 17 is made of considerable length and a little wider than necessary to receive a film. It is composed of the base piece 55 which has formed in it on both ends the slot 56 and lug 57, and the grooved sides 17 ending in the head 58 and braced and strengthened by the cross bars 18. On the outer edges of the sides are formed the lugs 19 their lower edge being at right angles with the side of the frame and their upper edges being obliquely downward and outward. They are placed at certain intervals along the edges, the lugs on one side being between the lugs on the other side in alternate relation to each other.

The film holder is composed of a frame similar to the slide frame but without grooves or lugs, and is designed to hold the picture films and to slide into the slide frame. I may make the film holder in another way in which it may take the place of the slide frame, without departing from the spirit of my invention, but rather adding to it. It is made from a blank stamped out as shown in Fig. 5 and the sides and ends folded over and clamped down on the film. In making this holder I may make the cut 65 Fig. 5 in the blank so that when the edge is turned and clamped down it will bear lugs similar to those on the slide frame, along the sides. In this case the film holder by being made a little wider may be used in place of the slide frame and slid directly in the slide ways 2, thus eliminating the slide frame altogether. Instead of making the cut 65 and leaving the lug 19 when the side is folded over, I may cut out the entire section 65' so that when the side is folded over there will be left the triangular recess 19'.

When the slide frame 17 containing the film holder filled with a film—or when the film holder made to take the place of the slide frame—is seated in the slide ways 2 with one of the dogs 16 engaging the lowermost lug, the talking machine is started and the motion transmitted as above described will at determined intervals retract the dog on one side from engagement with the lug and thrust the dog on the other side out so as to catch the lug on that side as the slide frame falls downward and hold it there presenting a new view until the revolution of the gear 47 causes the pin 49' to trip the other arm of the plate 42 and release that lug and thrust the dog on the other side out to catch the next lug. It will be seen that the action is wholly automatic and coöperative with the movement of the talking machine, and that the change of view may be made quicker or slower by changing the tread of the friction wheel to another groove in the friction disk.

Having fully described my apparatus, what I claim as my invention and desire Letters Patent for, is—

1. In an illustrating device for talking machines, the combination with a talking machine, of a projecting lantern, means in said lantern for intermittently changing the successive views of a film before the objective, a weighted disk seated on the revolving disk of the talking machine and adapted to revolve therewith, and means for operably connecting said weighted disk with the film changing mechanism.

2. In an illustrating device for talking machines, the combination with a talking machine, of a projecting lantern, a slidable film holder in the lantern, means for intermittently changing the position of said film holder in the lantern for illustrating successive views on the film, friction driving means seated on the revolving disk of the talking machine, and means for operably connecting said driving means with the film changing means in the lantern.

3. In an illustrating device for talking machines, a projecting lantern having vertical slideways, posts projecting horizontally from said lantern on each side of the slideway, a plurality of sleeves of different lengths on the posts, collars on the posts, set screws in the collars, condensing lenses seated between the posts and between the sleeves, and held rigid by the collars, adjustable means to attach illuminating means to the ends of the posts, means to hold a film intermittently in the slideways, means to release and drop the film in the slideway from one position to another, and means to connect the holding and releasing means operatively with the record on a talking machine, as described.

4. In an illustrating device for talking machine records, in combination with a projecting lantern and a talking machine, a shaft operably adjustable in length, bearing, and direction, a friction wheel on the shaft, a worm on the shaft, means to operably connect the friction wheel with the talking machine record, holding and releasing means, means for holding a film intermittently in front of the projecting apparatus, means to release and drop the film from one position to another, and means to operably connect the worm with the holding and releasing means as described.

5. In an illustrating device for talking machine records, the combination with a talking machine, of a projecting lantern, a slide or film changing mechanism comprising a worm gear, a holding and releasing plate, a film holder slidably mounted in front of the projecting apparatus of the lantern, means for operably connecting said worm gear, said plate and said film holder, friction driving means seated on the revolving disk of the talking machine, means for operably connecting said driving means with said worm gear, and means for intermittently tripping and dropping said film holder from one position in the lantern to another for illustrating successive views on the film, as described.

6. In a talking machine record illustrating device, a disk adapted to fit over the central pin of a talking machine record table and rest upon the record with frictional weight and to be revolved therewith, concentric grooved tracks in the top face of said disk, a central hollow vertical stem on said disk, a spring post resiliently seated in said stem, a bearing through said post, a downwardly held spring pin in the top of said post adapted to engage a groove in the shaft in the bearing, a shaft having a plurality of concentric grooves adapted to engage the bearing, a friction wheel on the shaft adapted to resiliently engage one of the concentric tracks on the face of the disk, and means to connect said shaft with a projecting lantern to drop a film intermittently through the lantern, as described.

7. A device for illustrating talking machine records, comprising a projecting lantern, an objective lens in the front of the lantern, an opening in the rear of the lantern, horizontal hollow posts on the outside of the rear of the lantern and outside of the opening, a plurality of different sized sleeves on the posts, collars on the posts outside of the sleeves, set screws in the collars, a lamp holder, pins on the lamp holder to slide in the hollow posts, condensing lenses between the posts between the sleeves and held rigid by the collars being pressed against the sleeves and fastened by the set screw, a vertical slideway secured to the back of the lantern between the opening and the posts, a slide frame adapted to slide on the slideways, lugs on both side edges of the slide frame in alternate relation to each other, a film holder adapted to slide in the slide frame, a film in the film holder, slots through the rear of the lantern on each side of the slideway, dogs projecting through said slots adapted to engage the lugs on the slide frame alternately on each side, a swivel plate pivoted to the bottom of the lantern and having the said dogs pivoted to its face, a spring connecting the two dogs, arms on the inner end of the plate, a pinion gear having a hub and pivoted to the bottom of the lantern with the hub between the arms of the plate, a pin on the hub adapted to engage the said arms in its revolution, a worm journaled to the bottom of the lantern at its front end and engaging the said pinion gear, a shaft on the worm and running out through the side of the lantern, a universal joint on the end of the shaft, a hollowed shaft connected by the universal joint to the worm shaft, a set screw in the hollow shaft, a friction wheel having a shaft on both sides, the shaft on one side telescoping in the hollow shaft and the shaft on the other side of the wheel having concentric grooves, a friction tire on the wheel, a disk having a central opening on its under side and adapted to rest on the record of a disk talking machine and revolve with the record by its frictional weight, concentric grooved tracks on the upper face of the disk, a central hollow vertical stem on said disk, a spring post resiliently seated in said stem, a bearing through said post, a downwardly held spring pin in the top of the said post adapted to engage the grooves in the friction wheel shaft when it is in the bearing, and a talking machine with a disk record, as specified.

8. In an illustrating device for talking machines, the combination with a talking machine, of a projecting lantern, an elongated picture film containing a plurality of views and adapted to illustrate the subject matter of a talking machine record, means for holding said film, means for intermittently changing the position of the film in the lantern for illustrating successive views, a friction driving means seated on the revolving disk of a talking machine, and means for operably connecting the driving means with the film changing mechanism, as described.

9. In an illustrating device for talking machines, the combination with a talking machine, of a projecting lantern, an elongated picture film containing a plurality of views and adapted to illustrate the subject matter of a talking machine record, means for holding said film, means for intermittently dropping said film from one position to another before the objective lens of said lantern for illustrating successive views on the film, a friction driving means seated on the revolving disk of the talking machine and a shaft adjustable relative to its length and having a universal joint, as means for transmitting motion from said driving means to the film changing mechanism, as described.

10. In an illustrating device for talking machines, the combination with a talking machine, of a projecting lantern, a film holding means, a film changing mechanism, means for operably connecting said holding means with said film changing mechanism, a weighted disk adapted to seat on the revolving disk of a talking machine, a shaft adjustable relative to its length and having a universal joint, and connected at one end to the film changing mechanism, a plurality of concentric grooves in the top of said weighted disk, a pulley on the other end of said shaft adapted to engage one of said grooves for transmitting motion from the machine to film in the lantern, as described.

11. In an illustrating device for talking machines, the combination with a talking machine, of a projecting lantern, a film slidable in said lantern, a film holding plate adapted to slide vertically before the objective lens of said lantern, means for tripping and dropping said holding plate intermittently from one position to another in the lantern, a frictional and adjustable driving mechanism adapted to operably connect the record of a talking machine with said film changing mechanism for intermittently and successively changing the views in the lantern.

HENRY SEEMANN.

Witnesses:
J. E. BOOKSTAVER,
A. L. KRAYBILL.